United States Patent [19]

Uhlig

[11] 3,940,231
[45] Feb. 24, 1976

[54] APPARATUS FOR MAKING BLOWN PLASTIC ARTICLES

[75] Inventor: Albert R. Uhlig, Toledo, Ohio
[73] Assignee: Owens-Illinois, Inc., Toledo, Ohio
[22] Filed: Nov. 22, 1974
[21] Appl. No.: 526,327

Related U.S. Application Data

[60] Division of Ser. No. 443,092, Feb. 15, 1974, Pat. No. 3,882,218, which is a continuation of Ser. No. 225,448, Feb. 11, 1972, abandoned.

[52] U.S. Cl. ..... 425/445; 425/DIG. 208; 425/387 B
[51] Int. Cl.² ........................................ B29D 23/03
[58] Field of Search 425/DIG. 208, 387 B, DIG. 206, 425/DIG. 209, DIG. 215, 445; 264/94, 97, 98

[56] References Cited
UNITED STATES PATENTS

| | | | |
|---|---|---|---|
| 2,792,593 | 5/1957 | Hardgrove, Jr. | 425/387 B |
| 3,222,725 | 12/1965 | Smith | 425/DIG. 208 |
| 3,761,550 | 9/1973 | Seefluth | 264/98 |

Primary Examiner—Richard B. Lazarus
Attorney, Agent, or Firm—Philip M. Rice; E. J. Holler

[57] ABSTRACT

The present invention provides an apparatus for thermally conditioning a blowable shape or parison, prior to blow molding, so that a subsequent blowing operation can be carried out under conditions conducive to bi-axial orientation in the final blown article.

More specifically, the parison is formed by conventional techniques, such as free extrusion or injection molding. The parison is then enclosed in a heat exchange chamber, having interior walls spaced substantially uniformly from the exterior of the parison, and the parison is exposed to a fluid heat transfer agent, so that the parison temperature is adjusted to that temperature at which the parison, upon expansion, will become bi-axially oriented. The fluid agent can either heat or cool the parison to the desired temperature.

6 Claims, 6 Drawing Figures

APPARATUS FOR MAKING BLOWN PLASTIC ARTICLES

RELATED APPLICATIONS

This application is related to the co-pending application Ser. No. 103,624 now U.S. Pat. No. 3,767,747, filed in the U.S. Pat. Office on Jan. 4, 1971, in the name of the present inventor and assigned to the Assignee of the present invention. This application is a division of my application Ser. No. 443,092 now U.S. Pat. No. 3,882,218, filed Feb. 15, 1974, which, in turn, is a continuation of my application Ser. No. 225,448, filed Feb. 11, 1972, and now abandoned.

BRIEF DESCRIPTION OF THE INVENTION

The invention of this application is related to the above-identified commonly invented and commonly owned applications. In the first mentioned earlier application, the desirability of bi-axial orientation during a blowing operation is set forth, the temperatures at which various materials must be for bi-axial orientation are defined, and a specific method, procedure, and apparatus are set forth to insure bi-axial orientation during blow molding.

The present invention provides a different apparatus for insuring bi-axial orientation during blow molding, but the result (the formation of a bi-axially oriented blown article) is the same as in the earlier application, and the broad method of obtaining this result (by thermally conditioning a blowable shape) remains the same.

It has been found that the most efficient orientation of material in the blow molding operation occurs when the material is stretched by blowing while the temperature is at that average wall temperature (i.e., the temperature throughout the thickness of the wall) which is most conductive to orientation. The average wall temperature for each essentially crystalline polymer lies intermediate the crystalline melting point of the material plus 20° F and the crystalline freezing point of the material less 20° F. With respect to essentially amorphous polymers, such as polyvinyl chloride and polystyrene, the glass transition temperature is utilized, rather than crystalline melting and freezing temperatures. For high density polyethylene (having a density lying between 0.954 and 0.970) it is preferable to operate at a temperature of 200° F plus or minus 20° F. For polyvinyl chloride and polystyrene, the ideal orienting temperature is 205° F plus or minus 25° F. For polypropylene, the ideal temperature is 310° F plus or minus 30° F.

In accordance with the present invention, a blowable shape or "parison" is formed by conventional techiques, i.e., by either injection molding or by free extrusion. This blowable shape is enclosed in a heat transfer chamber having interior walls which are substantially uniformly spaced from the exterior of the blowable portions of the parison. A heat transfer medium then flows through the space between the parison and the interior walls of the chamber for a period of time sufficient to obtain an average wall temperature in the parison which is most conductive to bi-axial orientation upon the subsequent blowing of the parison. In the event that the parison, as formed, is at a temperature lower than that at which maximum or most effective bi-axial orientation can be obtained, then the heat transfer medium is a heating medium. In the event that the parison is at a temperature higher than that which is most conductive to bi-axial orientation upon subsequent blowing, then the heat transfer medium is a cooling medium. Preferably, the interior of the parison is also thermally conditioned, although this is not critical, so long as the average wall temperature is at the desired level following the thermal conditioning of the parison.

In the carrying out of the method, the thermal conditioning step is performed intermediate the steps of (1) parison formation and (2) blow molding. Since some delay necessarily must be encountered in moving the parison physically from the conditioning step to the blowing step, then some thermal change may occur in the parison during any such delay. The temperature of the blowable parison portions following thermal conditioning is calculated to yield that temperature most conductive to bi-axial orientation during the final blowing. Since the parison probably will be cooled during the transfer, the thermal conditioning generally is carried out at a temperature slightly in excess of that conductive to bi-axial orientation.

OBJECTS

It is, therefore, an important object of the present invention to provide an apparatus for thermally conditioning a blowable parison of thermoplastic material so that a subsequent blow molding step is carried out at a temperature most conducive to bi-axial orientation.

Another important object of the present invention is the provision of an apparatus for forming bi-axially oriented blown plastic articles by subjecting blowable portions of the parison to a heat exchange medium to adjust the temperature of the blowable portions of the parison to a temperature which is most conducive to bi-axial orientation during the performance of a final blowing step.

Another important object of the present invention is the provision of an apparatus for thermally conditioning a blowable parison of thermoplastic material by circulating a fluid heat exchange medium in contact with the parison to heat or cool the blowable parison portions to a temperature most conducive to bi-axial orientation upon subsequent blowing.

It is a still further, and no less important, object of the present invention to provide an apparatus for making a bi-axially oriented blown plastic article by forming a blowable parison, enclosing the blowable parison interiorly of a heat exchange chamber having interior walls substantially uniformly spaced from the exterior of the parison, circulating a heat exchange fluid through the chamber to adjust the temperature of the blowable portions of the parison to a temperature most conducive to bi-axial orientation, and finally blowing the thermally conditioned parison at that temperature.

Other and further objects of the present invention will be apparent from the following detailed description of the invention and the appended drawings.

ON THE DRAWINGS

Figure 3:
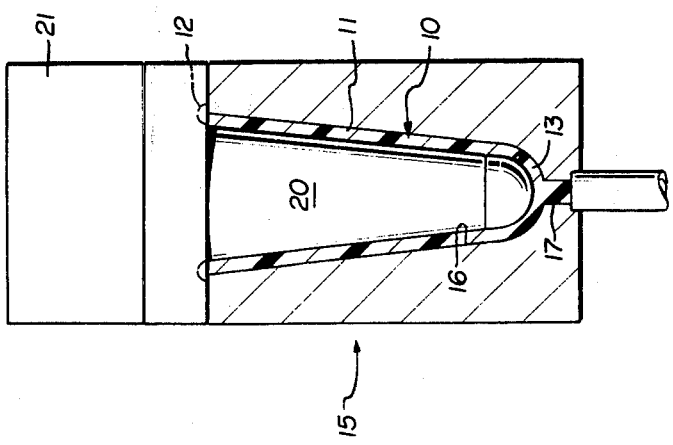
Figure 2:
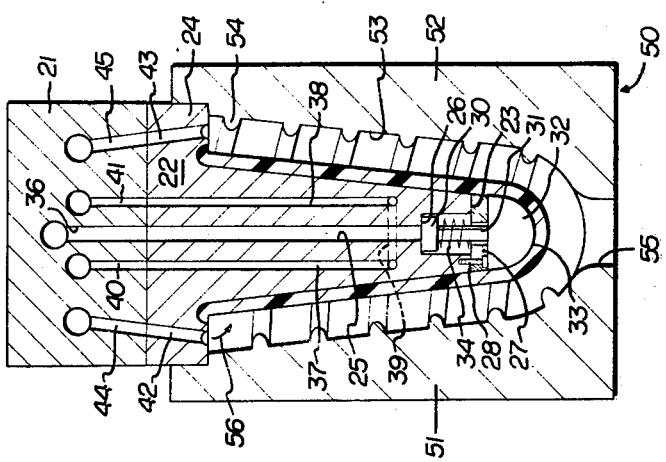
FIG. 2 is a vertical sectional view similar to FIG. 1 but illustrating the parison as enclosed within a heat exchange chamber.
Figure 1:
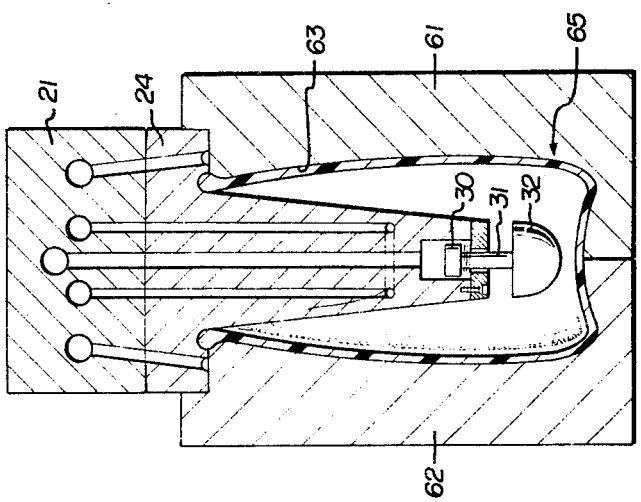
FIG. 1 is a vertical sectional view of that portion of the apparatus of the present invention utilized in forming a parison to be thermally conditioned and then blown according to the principles of the present invention.
Figure 6:
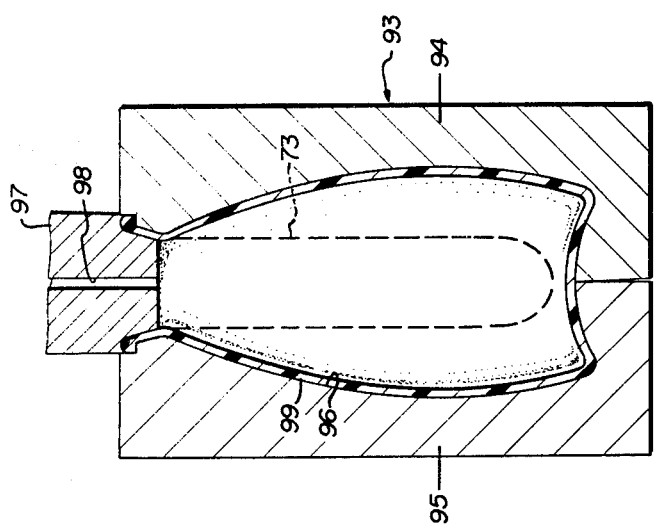
Figure 5:
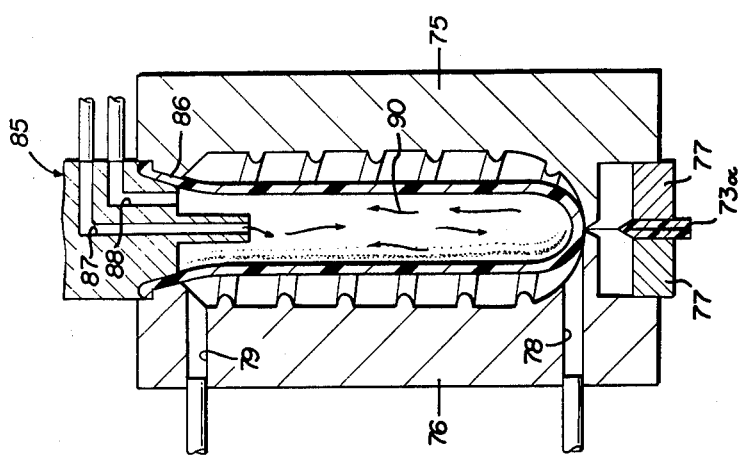
Figure 4:
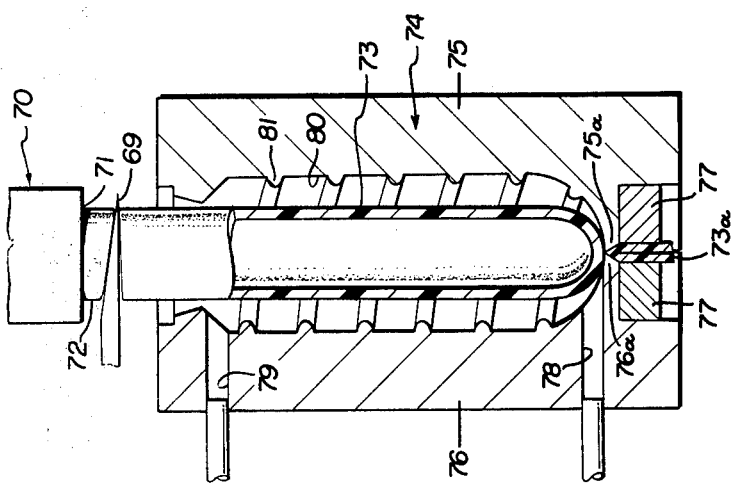

FIG. 3 is a view similar to FIGS. 1 and 2 but illustrating the final blowing apparatus of the present invention; and FIGS. 4 through 6 are similar to FIGS. 1, 2 and 3, but illustrating a modified apparatus of the present invention.

AS SHOWN ON THE DRAWINGS

In FIG. 1, reference numeral 10 refers generally to a blowable shape or "parison" from which a blown plastic article is ultimately formed. The parison 10 includes generally conical side walls 11 tapering from an enlarged finish 12 to a closed convex bottom 13.

The parison is formed by injection molding within a parison mold 15 having a mold cavity 16 conforming to the exterior surface of the parison and adapted to receive plasticized thermoplastic material through an injection passage 17. The interior of the parison is defined by a mold core 20 conforming in shape to the interior of the parison and depending from a core head 21. The core consists of a core body 22 terminating in a radial lower end surface 23 and having a radially enlarged flange 24 at its upper end. The core body 22 has an axial bore 25 therethrough, this bore 25 opening onto a lower spring chamber 26 located slightly above the end surface 23 of the core body. The radially enlarged chamber 26 is closed by an annular closure plate 27 secured to the lower end core body by suitable means, as by counter sunk screws 28. Located interiorly of the chamber 26 to be guided therein for axial movement is an enlarged head 30 secured through a stem 31 to a lower core tip 32, this core tip having a rounded, convex outer surface 33 conforming to the interior of the closed bottom 13 of the parison 10. The stem 31 accommodates the flow of blow air thereabout, as will be explained later.

A spring 34 is interposed between the enlarged head 30 and the annular plate 27 to normally urge the tip 32 snugly against the under surface of the plate and to retain the core in its position illustrated in FIGS. 1 and 2.

The axial bore 25 communicates with a passage 36 in the head 21 which is connected to a source of air under pressure. When the passages 36, 25 are opened to air under pressure, this pressure reacts against the head 30 and forces the head and the associated tip 32 downwardly against the bias of the spring 34 with the tip assuming the position shown in FIG. 3 of the drawings. In this way, air under pressure flowing about the stem 31 is introduced into the interior of the parison during the subsequent blow molding operation.

The core 22 also is provided with a pair of axially extending passages 37 and 38 which are joined by a transverse interior passage 39 to form a closed loop communicating through head passage 40 with a source of heat exchange fluid through head passage 41 with a return line to the source of the heat exchange fluid. Thus, the fluid will flow from the source through passages 40 and 37 through the return passage 39 and the passages 38, 41 back to the source. The heat exchange fluid can either be a cooling fluid or a heating fluid, as desired.

The core flange 24 carries a pair of fluid passages 42, 43 also communicating with the source of heat exchange fluid through head passages 44, 45, respectively. The fluid passages 44 and 45 are both connected to a source of heat exchange fluid which is introduced through the passages 42, 43 respectively for a purpose to be hereinafter more fully described.

Returning now to the operation of the apparatus of the present invention, the plasticized material is injected under pressure through the passage 17 into the space between the exterior of the core 20 and the parison mold cavity 16 to injection mold the parison. Conventional hot runner techniques are utilized to insure that the parison is injection molded without a sprue or "tail" and that the configuration illustrated in FIG. 2 of the drawing is obtained.

Next, the parison 10 is stripped from the parison mold 15 while still being supported upon the core 20, preferably by upwardly withdrawing the head and the core from the parison mold. The head 21, the core 20 and the injection molded parison 10 are now transferred to a thermal conditioning station illustrated in FIG. 2 of the drawings. This transfer can be carried out in any number of desired ways as is well known in the art.

At the conditioning station illustrated in FIG. 2 of the drawings, a thermal conditioning chamber indicated generally at 50 is provided. Specifically, this thermal conditioning chamber comprises a pair of openable and closeable chamber segments 51 and 52 which, when assembled, fit snugly at their upper ends, about the flange 24 of the core 20. The chamber 50 is provided with an internal recess 53 which conforms generally to the shape of the core 20 and the injection molded parison 10 thereon, the chamber 53 being of somewhat larger radial dimension and of somewhat greater length than the parison 10. The walls of this chamber 53 are preferably provided with interior fluid-directing fins 54 in the form of an internal spiral for directing air flow in an axial and peripheral spiral path around the exterior of the parison 10 as it is supported upon the internal core 20. The chamber 53 is provided with a restricted outlet opening 55 at its lower end, while the upper end of the chamber 53 communicates with the fluid inlet passages 42, 43 in the flange 24 of the core 20. Fluid under pressure introduced through the head passages 44, 45 and flowing through the core passages 42, 43 will enter the flow passage 53 defined by the chamber sections 51, 52 to be directed by the helical or spiral fins 54 in a spiral flow path as indicated by directional arrows 56. This fluid under pressure will flow over the exterior surface of the parison 10 until it exits through the passage 55 adjacent the closed bottom end 13 of the parison. Substantially the entire exterior surface of the parison will be exposed to this flow of heat exchange fluid. At the same time, heat exchange fluid is flowed through the head passages 40, 41 into the core passages 37, 38 and the return passage 39.

The heat exchange fluid can be either gaseous or liquid and any number of heat exchange fluids, such as air, carbon dioxide, water, water droplets suspended in air or other gaseous medium, or other materials may be utilized. The heat exchange fluid can either heat the parison or cool the parison, depending upon the temperature of the parison prior to its initial subjection to the heat exchange fluid and the final parison temperature which is desired.

As above explained, the heat exchange fluid is utilized to heat or cool the parison to a temperature most conducive to orientation during a subsequent blowing step. These temperatures and the ranges of the temperatures have been earlier defined.

Once the parison has obtained the desired temperature or has been "thermally conditioned" as desired, the thermal conditioning chamber sections 51, 52 are opened, and the thermally conditioned parison, while still supported on the core 20 is transferred to a blow molding station illustrated in FIG. 3 of the drawings. Once again, the transfer can be carried out in any desired manner.

At the blow molding station, the parison is positioned between closeable blow mold sections 61, 62 and the blow mold sections are closed on the parison still supported on the core, the blow mold sections cooperatively defining an interior blow mold chamber 63 which conforms to the final shape of the blown article.

It will be noted that the blow mold configuration is such that the sections 61 and 62 shut off the heat exchange fluid flow passages 42, 43 in the core 20.

Next, the passages 36, 25 are utilized in conjunction with the source of air under pressure (not shown) to blow the parison to its final configuration. The flow of air under pressure through these passages forces the piston 30 downwardly against the bias of the spring 34, opening the core for the flow of air about the stem 31, and the parison is inflated by the air thus introduced into the interior thereof.

Finally, the blow mold sections 61, 62 are opened and the finished bi-axially oriented blown article 65 is stripped from the core.

In that version of the invention illustrated in FIG. 4, 5 and 6 of the invention, the concept of thermal conditioning of a parison is applied to a freely extruded parison.

More specifically, a downwardly directed extrusion block 70 having an annular extrusion orifice 71 is utilized to issue a tubular extrudate 72. This extrudate 72 issues from the orifice 71 until a sufficient length of tubing has been formed to provide the parison indicated at 73. At this time the parison 73 is severed from the remaining extrudate 72 beneath the orifice 71 by a transversely operating knife 69.

The parison 73 is enclosed within a conditioning chamber 74 comprising a pair of chamber halves 75, 76 of roughly semi-cylindrical shape and provided with lower pinching projections 75a, 76a which pinch the tube shut to form a blowable shape or the finished parison. The chamber halves 75, 76 open and close transversely or radially relative to the parison 73, and each chamber section 75, 76 carries a tail plate 77 movable transversely with the chamber section but movably vertically relative thereto.

The chamber sections 75, 76, when closed, define an interior fluid pressure chamber 80 communicating with a source of heat exchange fluid under pressure through port 79 and with a heat exchange fluid return line through port 78. The interior cavity 80 is provided at its inner surface with a helical rib 81 which defines a spiral flow passage for heat exchange fluid entering through the port 79 and exiting through the port 78.

After formation of the parison and closure of the chamber 74 thereabout as indicated in FIG. 4, the parison and chamber are transferred to a parison conditioning station illustrated in FIG. 5. As indicated in FIG. 5, a heat exchange fluid flow head 85 is inserted into the free open upper end of the parison 73. This head 85 has a lower peripheral surface 86 insertable into the open upper end of the parison and displacing the open upper end of the parison radially outwardly against the surrounding portions of the chamber sections 75, 76 to seal the parison internally of the chamber 80. The head also has an inlet passage 87 for heat exchange fluid under pressure and an egress port 88 for removing heat exchange fluid, this fluid flowing through the center of the parison being indicated by directional arrows 90 in FIG. 5.

At the conditioning station, heat exchange fluid, such as the fluids above identified, introduced through the passage 79 and exiting through the passage 78 flow in a spiral path along the exterior surface of the parison in heat exchange contact therewith. At the same time, heat exchange fluid flows through the interior of the parison, this fluid being introduced through the inlet passage 87 and exiting from the egress port 88. The flow of heat exchange fluid is regulated by appropriate volume controls and pressure controls both at the exterior and interior of the parison so that there is no differential pressure across the walls of the parison, and appropriate volumes are introduced through the inlet ports 79, 87 and exited through the egress ports 78, 88 to maintain the parison in its position illustrated in FIG. 5.

As above explained, the heat exchange fluid utilized at the station indicated at FIG. 5 may be either a chilling medium or a heating medium, depending upon the temperature of the parison 73 with relation to the final parison temperature which is desired for orientation during a subsequent blow molding operation.

After the parison 73 has attained the desired temperature at the conditioning station of FIG. 5, the parison now is transferred by means of the head 85 to a blow molding station illustrated in FIG. 6. Prior to this transfer, the tail 73 formed during pinching shut of the parison as illustrated in FIG. 4 is removed by relatively moving the tail plates 77 downwardly. Also, prior to transfer, the conditioning chamber sections 75, 76 are opened following termination of the exchange fluid flow both internally and externally of the parison.

The parison, at the desired temperature, is simply transferred to the position illustrated in dotted outline at 73 in FIG. 6, and a blow mold indicated generally at 93 is closed thereon, this blow mold comprising blow molds sections 94, 95 which cooperatively define an interior cavity 96 corresponding to the shape of the final article to be formed. A final blow head 97 is inserted into the open upper end of the parison following the removal of the head 85, and blow air is introduced under pressure through the head passage 98 to inflate the parison 73 to its final shape 99. Since the parison has been conditioned at the station indicated in FIG. 5 to that temperature most conducive to orientation during blowing, the blowing step will finally orient the material during blowing to attain all of the advantages set forth above.

What is claimed is:

1. In an apparatus for making a blown plastic article by inflating interiorly of a blow mold a blowable preform of thermoplastic material having distendible side walls and a closed end wall, the improvements of a conditioning apparatus for ensuring the attainment of a desired orientation temperature of the pre-form prior to blowing of the pre-form to its final shape and including separable opposed chamber sections closeable in sealing relation upon the pre-form, said chamber sections cooperably defining an interior chamber having walls spaced substantially uniformly from the walls of the pre-form and having a closed end wall, and means for introducing a heat exchange fluid into the space intermediate the pre-form and the interior chamber walls, the fluid flowing into and through said space being in intimate surface contact with the side walls and the closed end wall of the pre-form.

2. In an apparatus as defined in claim 1, and wherein the pre-form is supported interiorly of said chamber, the further improvement of a heat exchange head having interior fluid ingress and egress passages communicating freely with the interior of the pre-form and second means for circulating heat exchange fluid through said passages at pressures and volumes correlated with the pressures and volumes of heat exchange fluid in said chamber to avoid distortion of said pre-form from its initial configuration.

3. In an apparatus as defined in claim 2 wherein the pre-form is an extruded tube, the further improvement in said first fluid circulating means of interior fluid ingress and egress passages extending through at least one chamber section and freely communicating with the interior of said chamber for circulating said heat exchange fluid in intimate surface contact with the exterior of said pre-form.

4. In an apparatus as defined in claim 2 wherein the pre-form is injection molded about a core, the further improvement wherein said first fluid circulating means includes additional interior ingress and egress passages in said heat exchange head, and wherein said second fluid circulating means is for varying the temperature of the core.

5. In an apparatus for making a blown plastic article by inflating a blowable pre-form of thermoplastic material interiorly of a blow mold, the improvements of a conditioning apparatus for obtaining a desired temperature of the pre-form prior to blowing of the pre-form to its final shape and including a chamber defining member for receiving the pre-form to be conditioned, said chamber defining member having interior walls substantially uniformly radially spaced from the exterior walls of the pre-form, means for circulating a heat exchange fluid in intimate surface contact with the exterior of the pre-form and confined thereagainst by said chamber interior walls, and fins formed on said interior walls of the chamber defining member for directing the flow of heat exchange fluid in the space between said interior walls and the pre-form.

6. The apparatus as defined in claim 5 wherein said fins are arranged in a generally spiral configuration.

* * * * *